(12) United States Patent
Burkhard et al.

(10) Patent No.: US 9,027,380 B2
(45) Date of Patent: May 12, 2015

(54) FORCE-TRANSMITTING MECHANISM WITH A CALIBRATION WEIGHT THAT CAN BE COUPLED AND UNCOUPLED

(75) Inventors: Hans-Rudolf Burkhard, Wila (CH); Ferdinand Schneider, Winterthur (CH)

(73) Assignee: Mettler-Toledo AG, Greifensee (CH)

( * ) Notice: Subject to any disclaimer, the term of this patent is extended or adjusted under 35 U.S.C. 154(b) by 466 days.

(21) Appl. No.: 13/413,265

(22) Filed: Mar. 6, 2012

(65) Prior Publication Data
US 2013/0233045 A1 Sep. 12, 2013

(51) Int. Cl.
*G01G 23/01* (2006.01)
*G01G 7/04* (2006.01)

(52) U.S. Cl.
CPC ........................ *G01G 7/04* (2013.01)

(58) Field of Classification Search
None
See application file for complete search history.

(56) References Cited

U.S. PATENT DOCUMENTS

| | | | |
|---|---|---|---|
| 4,099,587 A | 7/1978 | Kaufmann | |
| 4,343,373 A * | 8/1982 | Stadler et al. | 177/50 |
| 5,771,986 A | 6/1998 | Kohn et al. | |
| 5,866,854 A | 2/1999 | Emery et al. | |
| 6,194,672 B1 | 2/2001 | Burkhard et al. | |
| 7,429,705 B2 | 9/2008 | Genoud et al. | |
| 7,631,536 B2 | 12/2009 | Genoud et al. | |
| 2008/0218303 A1 | 9/2008 | Baltisberger et al. | |

FOREIGN PATENT DOCUMENTS

| | | |
|---|---|---|
| CH | 661121 A5 | 6/1987 |
| DE | 10007267 A1 | 7/2001 |
| DE | 10229016 A1 | 2/2004 |
| JP | 3761792 B2 | 1/2006 |

* cited by examiner

*Primary Examiner* — Robert R Raevis
(74) *Attorney, Agent, or Firm* — Standley Law Group LLP (57) ABSTRACT

A force-transmitting mechanism (110) has stationary and load-receiving portions (111, 112). The load-receiving portion is joined to a measurement transducer on the stationary portion through a force-transmitting connection, directly or through at least one coupling element (119) and at least one lever (116). The force-transmitting mechanism has a parallel-guided coupling means (124), a calibration lever (120) with a fulcrum on the stationary portion, and calibration lever arms (121, 122), one of which is rigidly connected to a calibration weight (123). The parallel-guided coupling means (124) is arranged between the second calibration lever arm and the at least one coupling element or an arm (117, 118) of the lever. The parallel-guided coupling means is divided into fixed and parallel-guided coupling parts (126, 125), which allows a force to be transmitted between the coupling parts. Parallel elements of the parallel-guided coupling part absorb relative traverse displacements from transmitted forces.

20 Claims, 9 Drawing Sheets

FORCE-TRANSMITTING MECHANISM WITH A CALIBRATION WEIGHT THAT CAN BE COUPLED AND UNCOUPLED

CROSS-REFERENCE TO RELATED APPLICATIONS

This non-provisional application makes no claim of priority.

TECHNICAL FIELD

The embodiments disclosed herein relate to a force-transmitting mechanism for a gravimetric measuring instrument, wherein the force-transmitting mechanism comprises a load-receiving portion and a stationary portion. A weighing pan which is connected to the load-receiving portion receives the load that is to be weighed. The force which the load exerts on the weighing pan is transmitted, either directly or by means of a force-reducing lever device, to a measurement transducer. A parallelogram linkage which constrains the weighing pan and the load-receiving portion in vertically guided movement, the force-transmitting mechanism and the measurement transducer together constitute in essence a weighing cell of a gravimetric measuring instrument.

BACKGROUND OF THE ART

Weighing cells of the known state of the art operate according to different working principles based for example on strain gauges, on taut-string oscillators, or on electromagnetic force compensation (EMFC). Gravimetric measuring instruments with oscillating-string or EMFC weighing cells produce weighing results of a very high resolution.

In EMFC weighing cells, the weight of the load is transmitted either directly or by way of one or more force-transmitting levers to an electromechanical measurement transducer which generates an electrical signal representative of the weight of the weighing load. The signal is further processed by an electronic signal-processing arrangement and presented in a display.

In their mechanical configuration, weighing cells that are based on the oscillating-string principle are largely analogous to EMFC weighing cells except that an oscillating-string transducer is used in place of an electromechanical transducer. The weighing load causes a change of the tensile force in an oscillating string, whose change in frequency, in turn, represents a measure for the applied load. At the time of the measurement, the mechanical system of EMFC weighing cells is in an equilibrium position comparable to the equilibrium of a mechanical beam balance with counterweights. In contrast, the load-receiving portion of an oscillating-string weighing cell will slightly change its vertical position relative to the stationary portion, as the string is put in tension and thus elongated to a very small degree under the weighing load. Oscillating-string weighing cells are therefore also referred to as "small-deflection" force-measuring cells.

Both types of weighing cells are used for example in precision balances and analytical balances in the milligram range, or in microbalances in the microgram range, and need to be periodically recalibrated to maintain their capability of delivering measurement values within a prescribed tolerance range in accordance with manufacturers' specifications and regulatory requirements. These periodic calibrations are a corrective measure against factors that have an influence on the weighing cell, for example a change in the ambient temperature or barometric pressure.

The calibration is performed by periodically loading the load-receiving portion with a known weight. Based on the difference between the weight value that was determined prior to delivery of the weighing cell during final inspection and the value found in the current measurement, a correction value can be calculated by means of which the subsequent measurement results of the weighing cell can be corrected. In order to provide the most accurate calibration value possible, the calibration weight should equal the load capacity of the weighing cell. This can have the consequence that very large calibration weights will be needed.

The known state of the art includes a variety of gravimetric measuring instruments having calibration weights that are integrally incorporated.

A gravimetric measuring instrument of this type which operates according to the principle of electromagnetic force compensation and has a built-in rod-shaped calibration weight is disclosed in EP 0 955 530 B1. The rod-shaped calibration weight is placed on a calibration weight arm that is coupled to the load-receiving portion and serves as a force-magnifying lever. Due to this lever advantage, the mass of the calibration weight, and thus its dimensions, can be kept small. Since the calibration weight arm is always coupled to the load-receiving portion, it only performs the functions of leveraging and supporting the calibration weight during the calibration processes but is not a part of the calibration weight itself. Consequently, the calibration weight arm is part of a force-transmitting mechanism, more specifically of a lever mechanism for transmitting and leveraging the load to the measurement transducer, and remains connected to the load-receiving portion also when the device operates in normal weighing mode.

As disclosed in CH 661 121 A5, the force-transmitting mechanism can also include a lever mechanism of more than one stage, wherein the individual levers are suitably connected to each other by means of coupling elements, so that a force reduction is achieved between the load-receiving portion and the measurement transducer. One of the coupling elements comprises holding means designed to receive a calibration weight.

A weighing cell with strain gauges which is disclosed in JP 3761792 B2 has a calibration weight with a ratio lever. A coupling element is arranged between the ratio lever and the load-receiving portion. By lifting the calibration weight and the coupling element, a load bearing which is formed on the coupling element is disengaged from a knife edge which is arranged on the load-receiving portion, whereby the ratio lever is uncoupled from the load-receiving portion.

All of the forgoing state-of-the-art solutions include calibration weight loading devices that are familiar to practitioners in the field of weighing technology.

The precise determination of the correction value is not only a function of the resolution of the measurement transducer, but also depends to a significant extent on how accurately the geometric proportions can be maintained. Even the smallest deviations of the calibration weight from its nominal position, for example on the calibration weight arm described in EP 0 955 530 B1, on the coupling member described in CH 661 121 A5, or the smallest change in the position of the load bearing relative to the knife edge in JP 3761792 causes the effective lever arm to be lengthened or shortened and thus introduces an error in the correction value. Consequently, the points of contact between the calibration weight and the calibration weight arm or between the knife edge and the load bearing are finished with the most exacting precision and thus at a high cost.

The present invention therefore has the objective to create a force-transmitting mechanism for a gravimetric measuring instrument with a measurement transducer, wherein a calibration weight can be coupled to the force-transmitting mechanism in such a way as to minimize the degree to which changes of the geometry can affect the force that the calibration weight exerts on the measurement transducer.

SUMMARY

This task is solved by the force-transmitting mechanism as disclosed here. The mechanism has a calibration weight lever, as well as by a gravimetric measuring instrument that comprises the force-transmitting mechanism.

A force-transmitting mechanism of a gravimetric measuring instrument has a stationary portion and a load-receiving portion. The load-receiving portion is coupled through a force-transmitting connection, either directly or by way of at least one coupling element and at least one lever, to a measurement transducer which is arranged on the stationary portion. The force-transmitting mechanism described here further comprises a parallel-guided coupling means and a calibration lever whose fulcrum is mounted on the stationary portion. The calibration lever has a first and a second calibration lever arm, wherein the parallel-guided coupling means couples the second calibration lever arm of the calibration lever to the at least one coupling element or to a lever arm of the at least one lever. The parallel-guided coupling means is divided into a fixed coupling part and a parallel-guided coupling part which are oriented relative to each other in such a way that only a tractive or a compressive force can be transmitted. The parallel-guided coupling part comprises a first and a second parallel element which are arranged parallel to each other and through which the parallel-guided coupling part is tied either to the second calibration lever arm or to the load-receiving portion, to the coupling element or to the lever arm, so that relative travers displacements which occur in the transmission of a force through the parallel-guided coupling means are absorbed by the first and second parallel element.

Thus, by means of the parallel-guided coupling means, the calibration weight can be coupled to the force-transmitting mechanism, whereby the latter can be calibrated. In the process of coupling the calibration weight into engagement with the force-transmitting mechanism it is possible that due to a difference in the swivel radii, transverse displacements will occur between the coupling point of the calibration weight and the distance to the nearest pivot points. These displacements can be compensated in particular by the parallel-guided coupling means, specifically by the parallel-guided coupling part.

The parallel-guided coupling means in this arrangement is configured in such a way that only compressive or tensile forces directed along the central lengthwise axis of the parallel-guided coupling means can be transmitted between the fixed coupling part and the parallel-guided coupling part.

The concept of the parallel-guided coupling means which is divided into two parts makes it possible that the calibration lever together with the solidly connected calibration weight can be coupled in force-transmitting engagement to, or totally disconnected from, the load-receiving portion, a coupling element, or a lever arm of the force-transmitting mechanism. The function of coupling or uncoupling can be performed by means of the previously mentioned calibration weight loading device, by lifting and lowering the calibration weight. Accordingly, the parallel-guided coupling means serves specifically to transmit the calibration weight force through tension or compression. When pushed in the opposite direction, the two parts of the coupling means separate from each other, so that no force can be transmitted between them. Depending on the actual configuration of the two parts of the coupling means, it is also possible that the separation takes place only when one part of the coupling means is displaced by a certain amount relative to the other part, in which case this displacement alone should be considered as meeting the spirit of the invention. In the uncoupled state, the two coupling parts are not in contact with each other, and no force can therefore be transmitted between them.

In addition, the two parallel elements of the parallel-guided coupling part are configured to be on the one hand as flexible as possible so that deflections will cause only small bending moments, and on the other hand to still be sufficiently stiff that the coupling parts will not be deflected under their own weight or as a result of inertial and dynamic forces while the force-transmitting mechanism is working in normal operating mode. The two parallel elements are parallel to each other and to the direction of the force that can be transmitted through the parallel-guided coupling means. The two parallel elements have the purpose to absorb transverse relative displacements at the coupling of the calibration weight, even if they are only small, which can occur when a force is transmitted through the coupling while a calibration measurement value is being determined.

In contrast to the existing state of the art where the force is transmitted through the supporting contact points of the calibration weight, the calibration weight force according to the concept of the invention is transmitted through the parallel-guided coupling means, specifically through the parallel elements of the coupling means. Consequently, the critical geometric dimensions always remain unchanged, because relative transverse position shifts between the fixed and the parallel-guided coupling part are absorbed by the parallel-guided coupling part rather than occurring at the actual points of force introduction which are determined by the unchangeable position of the two coupling parts and the two parallel elements. In weighing cells with electromagnetic force compensation, since the measurements are taken in the balanced state, the bending moments in the flexure pivots of the force-transmitting mechanism are approximately zero. The calibration lever, specifically its fulcrum flexure, is advantageously designed so that no bending moment occurs in the fulcrum flexure during the calibration process. What has been said here also applies with good approximation to oscillating-string weighing cells because the placing of a load on the load-receiving portion causes only a slight elongation of the string, and the bending moments occurring in the flexure pivots of the force-transmitting mechanism are therefore only of limited magnitude.

In one embodiment, the fixed coupling part and the parallel-guided coupling part each have one or more contact locations for the transmission of compressive forces, with the respective contact points of the fixed and the parallel-guided coupling part being aligned opposite each other. The force-transmitting contact locations can be designed so that the fixed and the parallel-guided coupling part will center themselves relative to each other in the calibration process.

If tractive forces are to be transmitted, one of the two coupling parts can include a first traction element, for example with a convex projection, while the other coupling part comprises a second traction element, for example with a concave bearing seat, wherein the first and the second traction element engage each other, the projection is aligned with the concave bearing, and tractive forces are transmitted through the contact between the projection and the bearing.

In a further embodiment, the first traction element can be arranged at least partially inside the coupling part that contains the second traction element. At least a part of the first traction element can thus be arranged inside the coupling part which contains or reaches into the second traction element.

In a further embodiment, the first and the second parallel element comprise integral flexure pivots which, based on their generically inherent properties, particularly their capability to transmit compressive or tractive forces along their central longitudinal axis, their ability to act as a spring, as well as their elastic bending properties, are particularly suited for use in a parallel-guided coupling means described herein.

The force-transmitting mechanism can also comprise a parallel-guiding arrangement, whereby the load-receiving portion is constrained to the stationary portion and guided in vertical movement (relative to the operating position of the device) by means of at least one upper parallel-guiding member and at least one lower parallel-guiding member.

The force-transmitting mechanism can consist of a plurality of individual components which are assembled into a unit by means of connector elements. However, several of these components can also be integrally connected to each other. Preferably, at least the load-receiving portion, the stationary portion, the calibration lever and the parallel-guided coupling means are monolithically connected to each other.

As has already been mentioned previously, the force-transmitting mechanism as described herein together with a measurement transducer and a calibration weight can be used as a weighing cell in a gravimetric measuring instrument. A gravimetric measuring instrument is normally calibrated in such a way that the weight force of the calibration weight, after it has been transmitted by the force-transmitting mechanism, will act on the measurement transducer in the same direction as a force applied to the load-receiving portion. Consequently, the load of a calibration force is applied to the measurement transducer in the same way as a weighing load during operation in normal weighing mode. In oscillating-string weighing cells, the measurement transducer can in most cases only accept a load acting in the same direction as a weighing load. Thus, the inventive concept of the foregoing description is equally applicable for oscillating-string weighing cells and EMFC weighing cells.

However, it is also possible that the force-transmitting mechanism is designed so that the weight force generated by the calibration weight and a force resulting from a load placed on the load-receiving portion will act on the force measurement transducer in the opposite directions. This configuration is suitable in particular for EMFC weighing cells whose measurement transducer operates according to the push-pull principle as described in detail in US 2008/0218303 A1. With this design, the calibration weight can be used as a compensation weight to expand the load range of the weighing cell. A weighing cell of this configuration could for example be used with the calibration weight in the uncoupled position to weigh loads in the 0 to 100 gram range, and to expand the weighing range for loads between 100 and 200 grams by coupling the calibration weight to the force-transmitting mechanism, as the weight force of the calibration weight counteracts the load acting on the load-receiving portion.

The calibration weight is normally made of a corrosion-resistant material with a uniform density of $\rho=8.0$ kg/dm$^3$. However, the calibration weight can also be made in part of the same material as the force-transmitting mechanism and supplemented with an auxiliary mass of higher density. The accuracy of the calibration value can further be increased by using a pressure sensor for the measurement of the ambient barometric pressure of the gravimetric measuring instrument. Its measurement value can be used to calculate a correction for the air buoyancy of the calibration weight, as the buoyant force of the air displaced by the calibration weight acts in the opposite direction of the weight force of the calibration weight.

BRIEF DESCRIPTION OF THE DRAWINGS

Different variations of embodiments of the force-transmitting mechanism and their use in a gravimetric measuring instrument are described in more detail with the help of the attached drawings, wherein elements that are identical from one drawing to another are identified by the same reference symbols, and wherein.

DETAILED DESCRIPTION OF THE DRAWINGS

Figure 1:
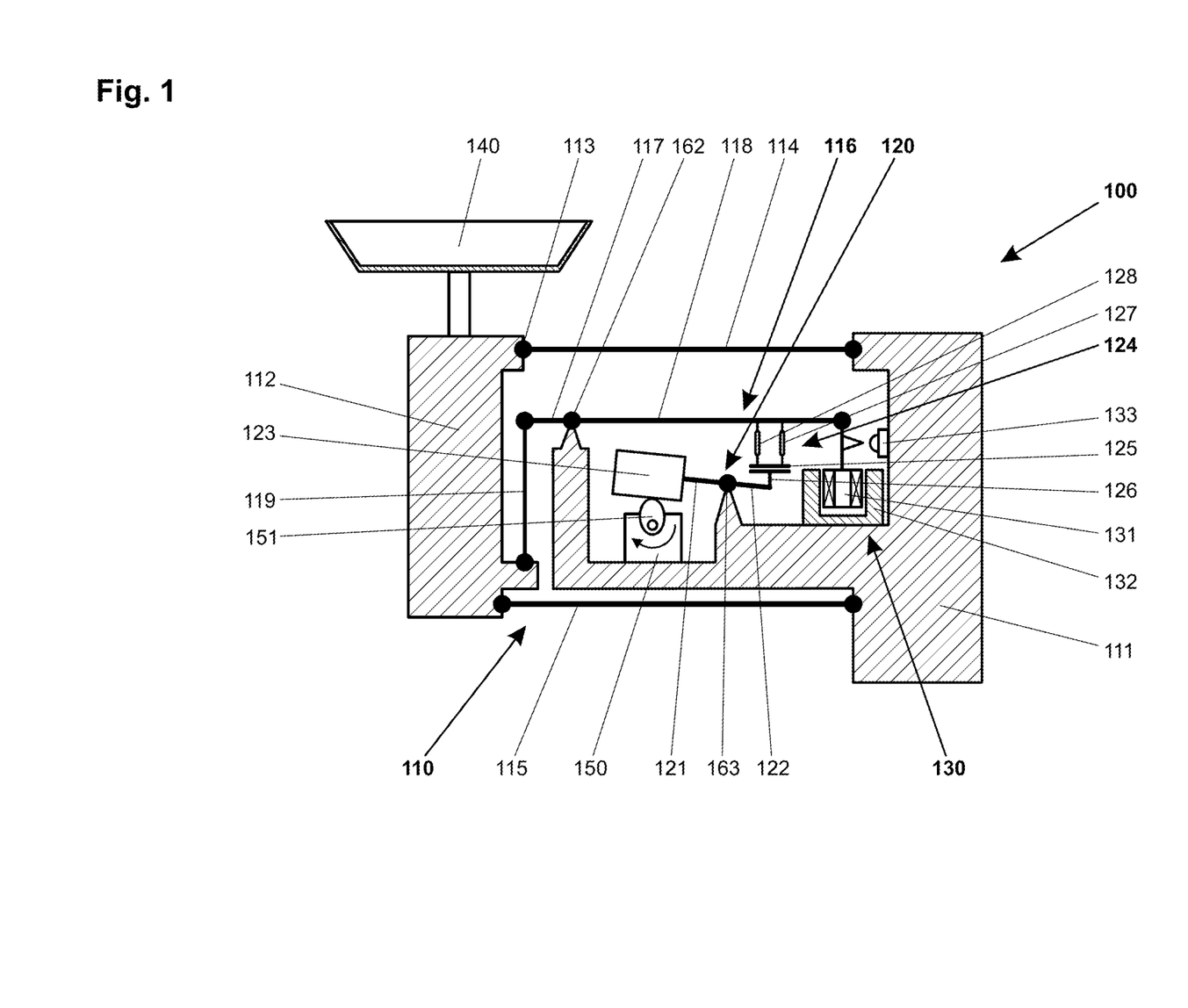
FIG. 1 is a side elevation view of a weighing cell, with an embodiment of the force-transmitting mechanism that comprises a lever system between the load-receiving portion and the measurement transducer for the reduction of the force acting on the load-receiving portion, wherein a parallel-guided coupling means is arranged between the lever system and the calibration lever for the transmission of only compressive forces.

FIG. 1 schematically illustrates a weighing cell 100 with an embodiment of the force-transmitting mechanism 110. The force-transmitting mechanism 110 comprises a stationary portion 111 and a load-receiving portion 112. The load-receiving portion 112 is constrained with guided mobility relative to the stationary portion 111 by means of a first parallel-guiding member 114 and a second parallel-guiding member 115. All of the pivoting junctures 113 of the force-transmitting mechanism 110 are represented as large circular dots and can be realized through any conventional design. These pivoting joints 113 are normally configured as narrow and flexible material connections as shown in FIGS. 6 to 12.

Connected to the load-receiving portion 112 is a load receiver 140 in the form of a weighing pan. Further, mounted rigidly on the stationary portion 111 is a measurement transducer 130 with the capability of producing a weighing signal representative of a force. The measurement transducer 130 in this illustration includes a coil 131 and a magnet 132 as well as a position sensor 133. The magnet 132 is rigidly connected to the stationary portion 111, and the force that is to be measured acts on the coil 131 which is arranged in a contact-free floating position inside the magnet 132. The force acting on the coil 131 causes the latter to move in relation to the magnet 132, and this displacement is detected by the position sensor 133. The signal produced by the position sensor 133 is sent to an electronic control circuit which continuously regulates a current flowing through the coil 131, so as to restore the original position of the coil 131 in relation to the magnet 132 regardless of the effect of the applied force. The current flowing through the coil 131 is measured, the resultant raw measurement signals are processed by the electronics of the balance (not shown in the drawing) to produce a measurement value which is sent to an indicator (likewise not shown) and displayed. Of course, the measurement transducer 130 shown here can also be replaced by other measurement transducers, for example oscillating-string transducers, inductive and capacitative measurement transducers, strain-gauge-based transducers and the like.

As the measurement transducer 130 can only generate a limited compensating force to balance the force acting on the load-receiving portion 140, a lever arrangement with one or more stages is used in many cases for the reduction of the force that is to be measured. The lever arrangement is interposed between the load-receiving portion 112 and the measurement transducer 130 to perform its force-reducing function. The lever arrangement illustrated in FIG. 1 has a lever 116 that is pivotally supported on the stationary portion 111 and whose short lever arm 117 is connected by way of a first coupling element 119 to the load-receiving portion 112. The long lever arm 118 of the lever 116 is connected to the coil 131.

The force-transmitting mechanism 110 further comprises a calibration lever 120, which is likewise pivotally mounted on the stationary portion 111 and whose first calibration lever arm 121 is rigidly connected to a calibration weight 123. The function of transmitting the weight force of the calibration weight 123 is performed by a parallel-guided coupling means 124 which has a parallel-guided coupling part 125 connected to the longer lever arm 118 by means of two parallel elements 127, 128 that have flexure pivots in the form of narrow material connections, and further has a fixed coupling part 126 connected to the second calibration lever arm 122, so that the parallel-guided coupling means 124 is arranged between the longer lever arm 118 and the second calibration lever arm 122. The first and the second parallel element 127, 128 are shown here as representative examples for any possible pivoting constraints such as narrow and flexible materially integral connections, leaf springs and other configurations known to practitioners in this field, which possess a certain degree of inherent stiffness or whose pivoting angles are mechanically delimited. The latter properties of the parallel elements 127, 128 are advantageous for pivoting connections working in a compressive mode as shown here, particularly if they are designed in the form of flexure pivots.

As illustrated in FIG. 1, a calibration weight loading device 150 is mounted on the stationary portion of the force-transmitting mechanism. Depending on the position of the cam disk 151 of the loading device 150, the calibration weight is supported by the stationary portion 111 or set free. When the calibration weight is supported in its rest position by the cam disk 151, the parallel-guided coupling part 125 and the fixed coupling part 126 are separated from each other. When the calibration weight is free of the cam disk, the two parts 125, 126 of the coupling means are lying against each other, whereby the weight force of the calibration weight 123 is transmitted to the lever 118 and thus to the coil 131 of the measurement transducer 130. As is clearly evident from the schematic illustration, the coupling means 124 shown here allows only compressive forces to be transmitted, because when the calibration weight 123 is free of the cam disk, the fixed coupling part 126 is pushed against the parallel-guided coupling part 125 and thus acts in opposition to the reactive force that is generated by the measurement transducer 130.

The parallel elements 127, 128 of the parallel-guided coupling part 125 are configured so that they can absorb transverse displacements which occur in the process of transmitting a force, as will be explained in more detail in the context of FIG. 3.

Figure 2:
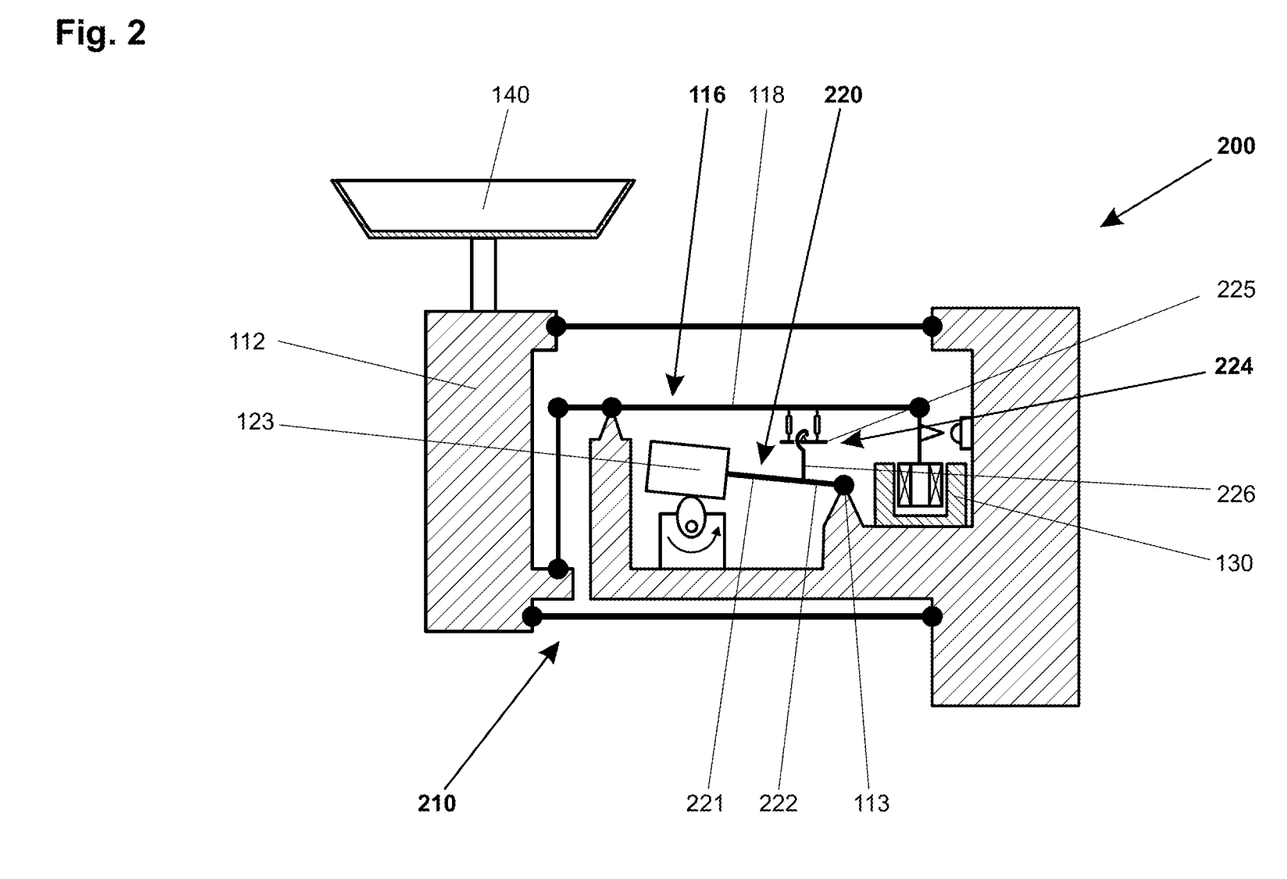
FIG. 2 is a side elevation view of a weighing cell, with a further embodiment of the force-transmitting mechanism that comprises a lever system between the load-receiving portion and the measurement transducer for the reduction of the force acting on the load-receiving portion, wherein a parallel-guided coupling means is arranged between the lever system and the calibration lever for the transmission of only tractive forces.

FIG. 2 schematically represents a weighing cell 200 with a further embodiment of the force-transmitting mechanism 210 in a side elevation drawing. Except for the calibration lever 220 and the parallel-guided coupling means 224, all of the elements shown are the same as in FIG. 1 and will therefore not be covered again in the following description.

The calibration lever 220 shown in FIG. 2 likewise has a first calibration lever arm 221 and a second calibration lever arm 222, wherein the first calibration lever arm 221 extends from the calibration weight 123 to the fulcrum 113 and the second calibration lever arm 222 extends from the fulcrum 113 to the fixed coupling part 226 of the parallel-guided coupling means 224.

The parallel-guided coupling means comprises a parallel-guided coupling part 225 and a fixed coupling part 226 which in the load-free state reach into each other without coming into contact. As soon as the calibration weight 123 is released, which will cause a tractive force to be transmitted from the fixed coupling part 226 to the parallel-guided coupling part 225 and thus to the longer lever arm 118 of the lever 116, the fixed coupling part 226 will settle into engagement with the parallel-guided coupling part 225 after the two parts have moved relative to each other along a defined short displacement path.

It should also be mentioned that in this example the tractive force transmitted from the calibration weight to the longer lever arm 118 works in opposition to the force of a load to be measured which has been placed on the load receiver 140. With this arrangement, the calibration weight 123 can also be used for the purpose of expanding the weighing range of the weighing cell 200. With one calibration weight 123, the maximally achievable expansion is a doubling of the weighing range, if the force exerted by the calibration weight 123 on the measurement transducer 130 is equal to the force-measuring capacity. Invisible to the user, the weighing range is in this case divided into two partial ranges, where in the first partial range there is no force transmitted from the calibration weight 123 to the measurement transducer 130, while in the second partial range the calibration weight 123 is coupled to the lever system. It is possible that the engagement of the calibration weight 123, specifically the added influence of the fulcrum joints of the calibration lever 220, may slightly influence the accuracy of the measurement values. This can be taken into account by displaying the weighing results in the higher partial range with a lower digital resolution and/or assigning a lower accuracy class rating to the higher partial range. All of the functions which have just been described can be controlled automatically by the balance electronics as a function of the weighing load without the user having to concern himself with the selection of the appropriate partial range.

Figure 3:
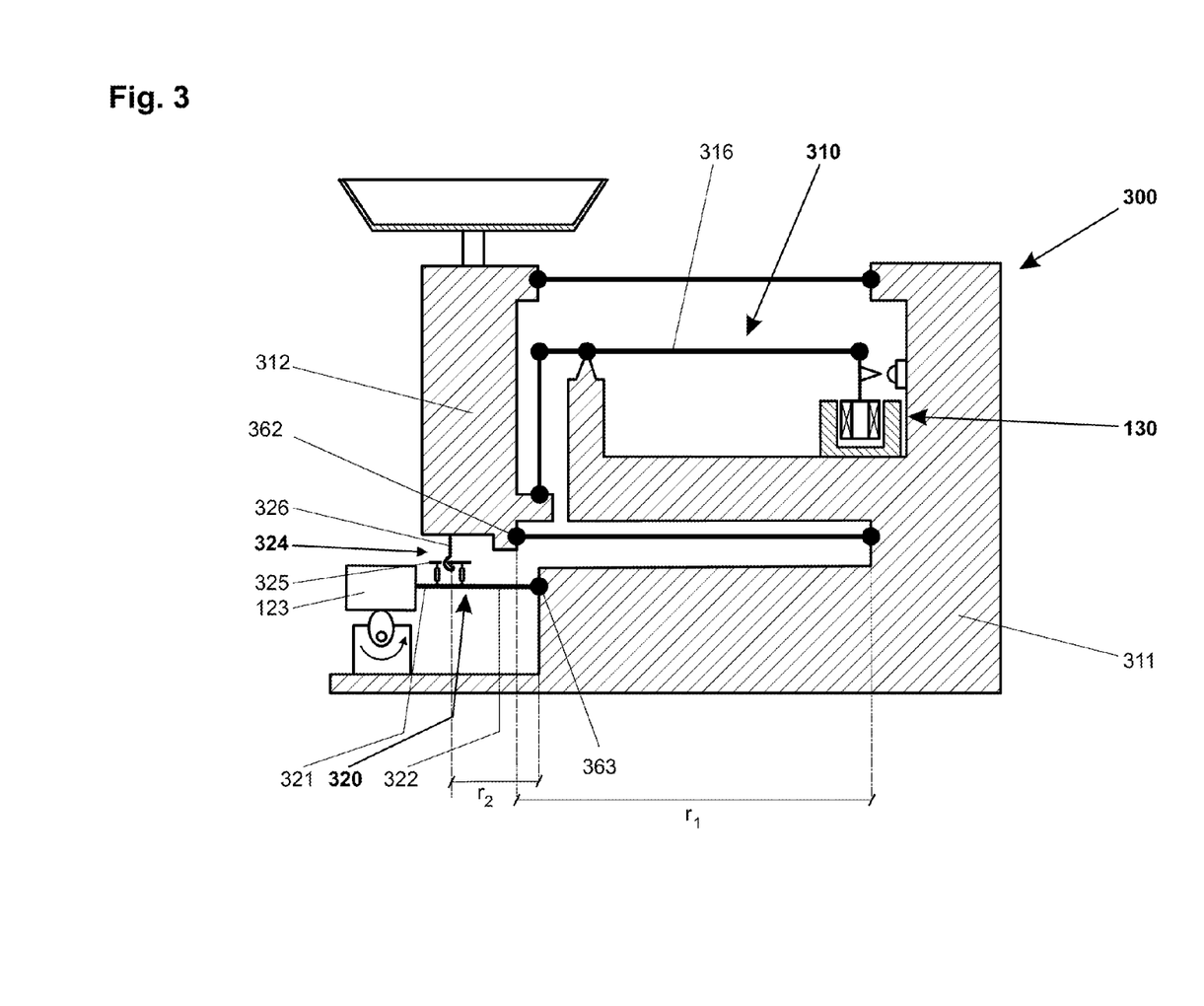
FIG. 3 is a side elevation view of a weighing cell, with a further embodiment of the force-transmitting mechanism that comprises a lever system between the load-receiving portion and the measurement transducer for the reduction of the force acting on the load-receiving portion, wherein a parallel-guided coupling means is arranged between the lever system and the calibration lever for the transmission of only tractive forces.

Of course, the calibration weight 123 can also be designed to act more directly on the load-receiving portion, as illustrated in FIG. 3 which shows a side elevation drawing of a weighing cell 300 with a further embodiment of the force-transmitting mechanism 310. Except for the calibration lever 320 and the parallel-guided coupling means 324, all of the elements shown are analogous to those in FIG. 1 and will therefore not be covered again in the following description. The lever arrangement comprises a lever 316 which is arranged between the load-receiving portion 112 and the measurement transducer 130. The calibration lever 320 with a calibration weight 123 is pivotally connected to the stationary portion 311 and located (in reference to the operating position of the weighing cell 300) below the load-receiving portion 312. The function of transmitting the force from the calibration lever 320 to the load-receiving portion 312 is performed by the parallel-guided coupling means 324 which is capable of transmitting tractive forces. In this example, the parallel-guided coupling part 325 is connected to the calibration lever 320, while the fixed coupling part 326 is connected to the load-receiving portion 312. The shorter the second lever arm 322 of the calibration lever 320 is selected in relation to the first calibration lever arm 321, the larger the calibration force transmitted by the parallel-guided coupling means 324 to the load-receiving portion 312.

The parallel-guided coupling means 324 has the purpose of absorbing transverse forces which, in the absence of a parallel-guiding arrangement, would occur with a position change of the parts of the coupling means, because a horizontal position shift between the parts could in this case give rise to internal reactive forces between the pivoting joints 362 and 363 due to the different swivel radii $r_1$, $r_2$. These transverse internal reactions are absorbed by the parallel-guided coupling means 324, specifically by the parallel-guided coupling part 325.

Of course, the arrangement in the example of FIG. 3 could also be used in combination with a system where the force to be measured is introduced directly, as disclosed, for example, in CH 593 481 A5 or in EP 1 726 926 A1. The calibration weight 123 would in this case be coupled directly to the measurement system rather than by way of a parallelogram or a lever system, as indicated in FIG. 3 by the fact that the fixed coupling part 326 is attached to the load-receiving portion 312.

Figure 4:
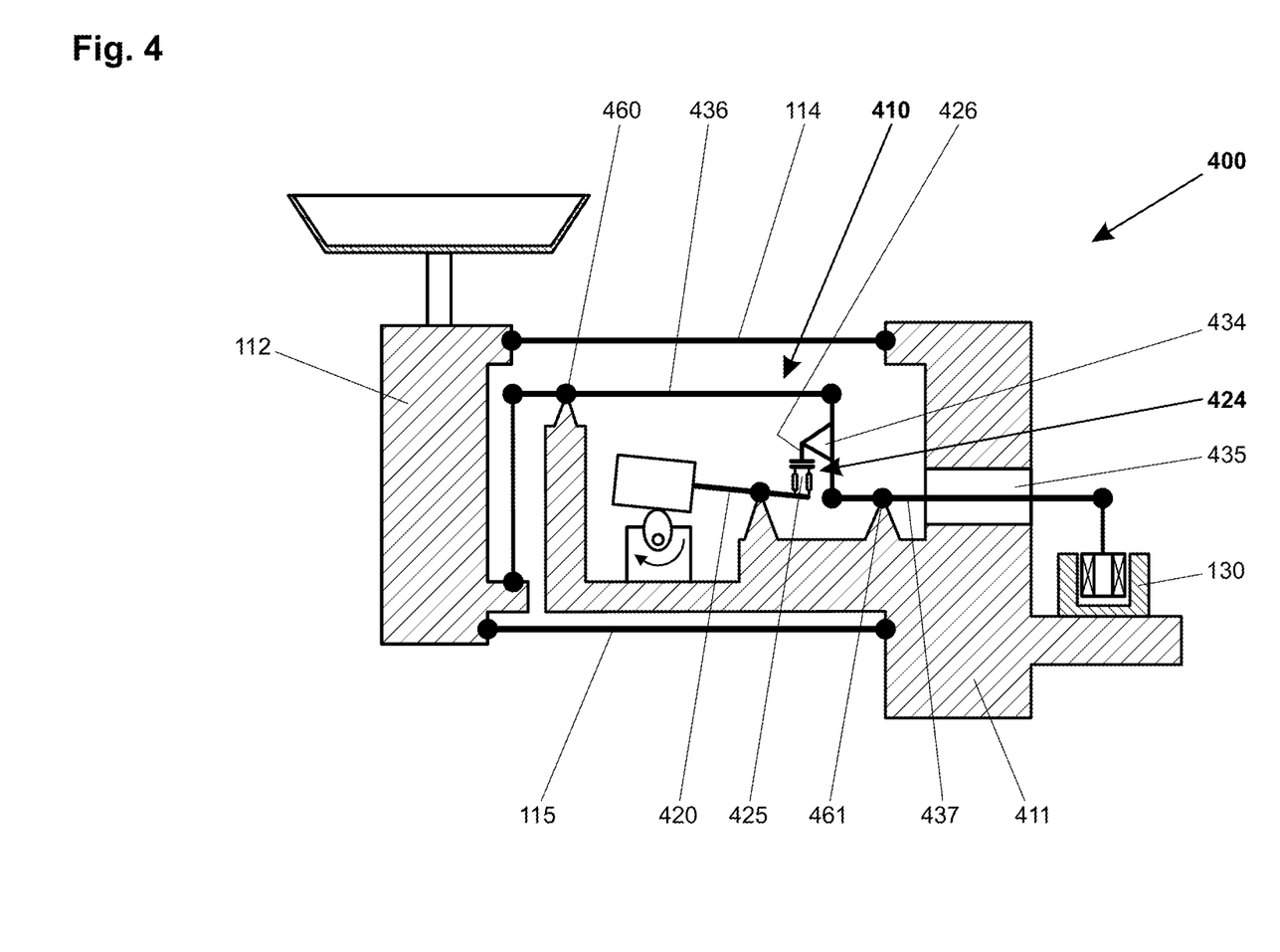
FIG. 4 is a side elevation view of a weighing cell, with a further embodiment of the force-transmitting mechanism that comprises an arrangement of two levers between the load-receiving portion and the measurement transducer for the reduction of the force acting on the load-receiving portion, wherein a parallel-guided coupling means is arranged between the lever system and the calibration lever for the transmission of only compressive forces.

FIG. 4 schematically represents a weighing cell 400 in a side elevation drawing, with a further embodiment of the force-transmitting mechanism 410 that comprises an arrangement of two levers 436, 437 between the load-receiving portion 112 and the measurement transducer 130 for the reduction of the force acting on the load-receiving portion 112. FIG. 4 likewise contains some components that are also present in the preceding drawing figures and which are therefore identified by the same reference symbols or are not described again. The first lever 436 is coupled by way of a force-transmitting coupling element 434 to the second lever 437. A parallel-guided coupling means 424 capable of transmitting compressive forces only is arranged between the coupling element 434 and a calibration lever 420 which is pivotally supported on the stationary portion 411. The fixed part 426 of the coupling means 424 is connected directly to the coupling element 434, while the parallel-guided coupling part 425 is connected to the calibration lever 420. In the illustrated embodiment, the offset between the respective lines of action of the forces in the coupling element 434 and in the laterally connected parallel-guided coupling means 424 introduces a torque which gives rise to reactive forces in the fulcra 460, 461 of the levers 436, 437. Solutions in which the two lines of action coincide with each other are therefore preferable.

In order to facilitate the exchange of the measurement transducer 130, the stationary portion 411 has a breakthrough opening 435 through which the second lever 437 passes, so that the measurement transducer 130 can be arranged on the side of the stationary portion 411 that faces away from the parallel-guiding members 114, 115.

Figure 5:
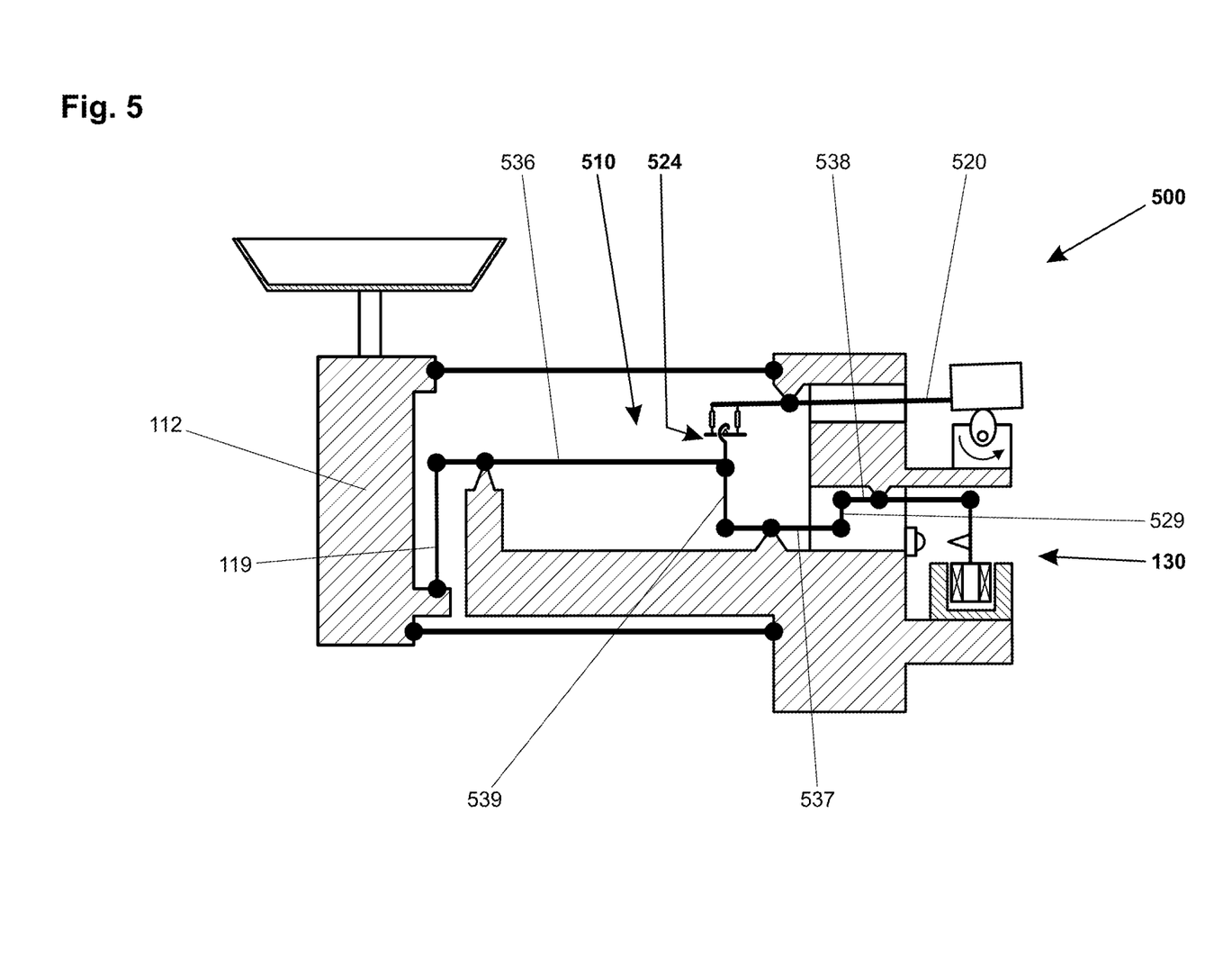
FIG. 5 is a side elevation view of a weighing cell, with a further embodiment of the force-transmitting mechanism that comprises an arrangement of three levers between the load-receiving portion and the measurement transducer for the reduction of the force acting on the load-receiving portion, wherein a parallel-guided coupling means is arranged between the lever system and the calibration lever for the transmission of only tractive forces.

FIG. 5 schematically represents a weighing cell 500 in a side elevation drawing, with a further embodiment of the force-transmitting mechanism 510. The latter comprises a lever arrangement with three levers 536, 537, 538 between the load-receiving portion 112 and the measurement transducer 130 for the reduction of the force acting on the load-receiving portion 112. As shown already in FIG. 4 and described above, the first lever 536 is connected by means of a second force-transmitting coupling element 539 to the second lever 537, and the second lever 537 is connected by means of a third force-transmitting coupling element 529 to the third lever 538 5. A parallel-guided coupling means 524 which is capable of transmitting only tractive force is arranged between the lever system and a calibration lever 520. The calibration force is introduced at the second coupling element 539 which connects the first lever 536 to the second lever 537, wherein the parallel-guided coupling means 524 is not arranged in parallel (as it is in FIG. 4) but rather in series to the second coupling element 539. The serial arrangement avoids the drawback that a torque is exerted on the second coupling element 539 during the calibration process, as could be the case with the coupling element 434 shown in FIG. 4.

Figure 6:
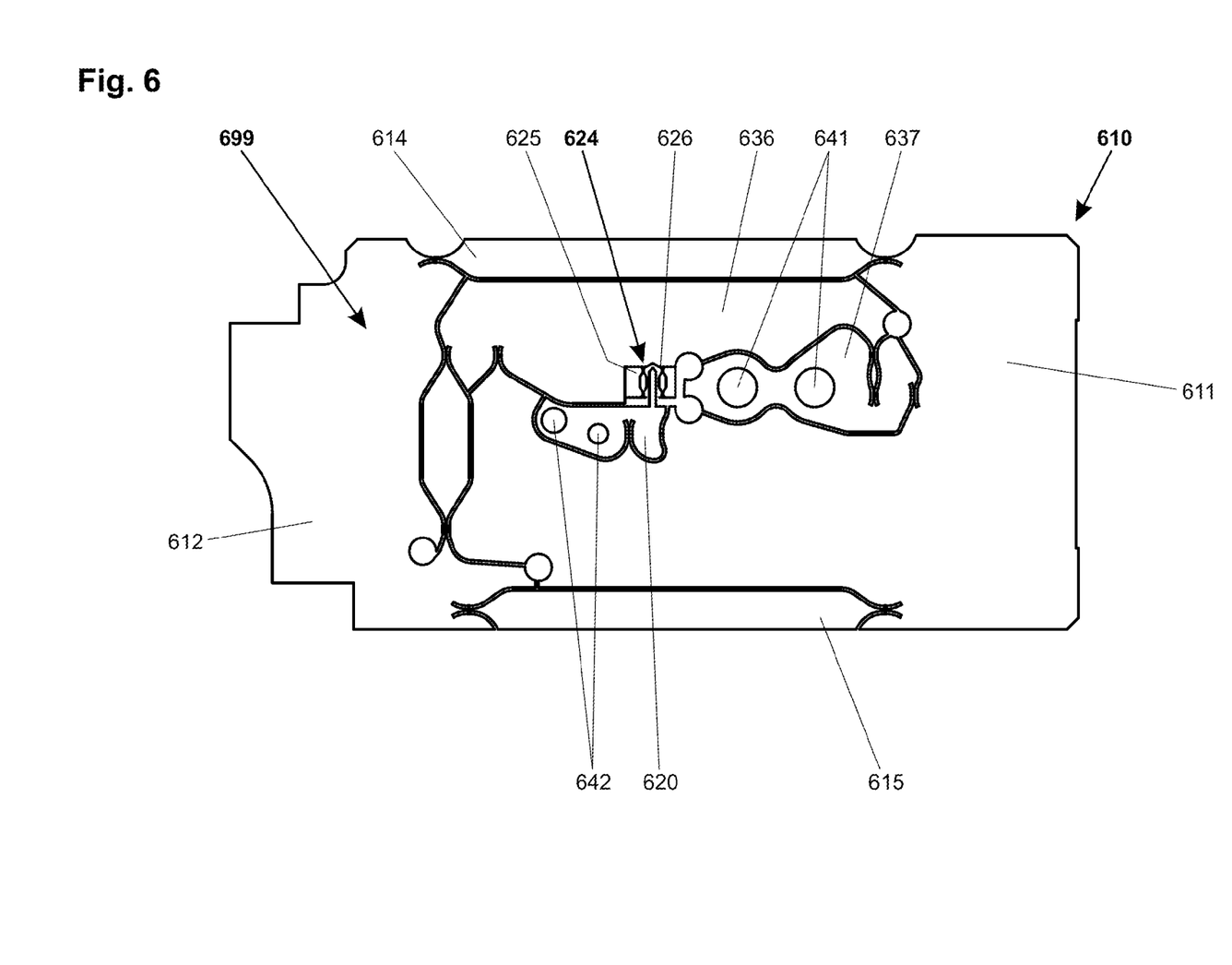
FIG. 6 is a side elevation drawing of a monolithically configured force-transmitting mechanism in which a lever system, a coil lever, a calibration lever, the coupling elements connecting the levers, as well as a parallel-guiding linkage are integrally formed by means of thin linear cuts, wherein a parallel-guided coupling means between the lever system and the calibration lever comprises a parallel-guided coupling part and a fixed coupling part.

FIG. 6 illustrates a monolithically configured force-transmitting mechanism 610 in a side elevation drawing. A material block 699 delimited by its contour lines is perforated by narrow linear cuts which traverse the block 699 at a right angle to the drawing plane in such a way that the cuts delineate the contours of a first lever 636, a second lever 637, a calibration lever 620, a first parallel-guiding member 614, a second parallel-guiding member 615, the stationary portion 611, the load-receiving portion 612, as well as a first coupling element and a second coupling element. All of these parts which are formed by the narrow linear cuts are connected to each other by narrow and flexible material connections which are likewise formed by the cuts, so that the force-transmitting mechanism 610 has in essence a load-receiving portion 612 tied to the stationary portion 611 for guided mobility, and a lever system 636, 637 as well as a calibration lever 620. The second lever 637 is connected by means of a lever arm extension (not shown in the drawing) to the measurement transducer (likewise not shown in the drawing). The second lever 637 comprises two holes 641 for the attachment of the lever arm extension. The calibration lever 620 also has two holes 642 for the attachment of a calibration weight. A parallel-guided coupling means 624 which comprises a parallel-guided coupling part 625 and a fixed coupling part 626 is arranged between the first lever 636 and the calibration lever 620. For the transmission of compressive forces, a first contact location is formed on the parallel-guided coupling part 625, and a second contact location is formed on the fixed coupling part 626. The contact locations which, in order to transmit a force, can be moved into engagement with each other are aligned essentially parallel to each other in this example.

FIGS. 7 to 11 show different embodiments of a parallel-guided coupling means which can be arranged in a force-transmitting mechanism of a weighing cell as illustrated in FIGS. 1 to 6. The parallel-guided coupling means has a parallel-guided coupling part and a fixed coupling part, one of which is connected to the load-receiving portion or the lever system of a force-transmitting mechanism, while the other is connected to the calibration lever.

Figure 7:
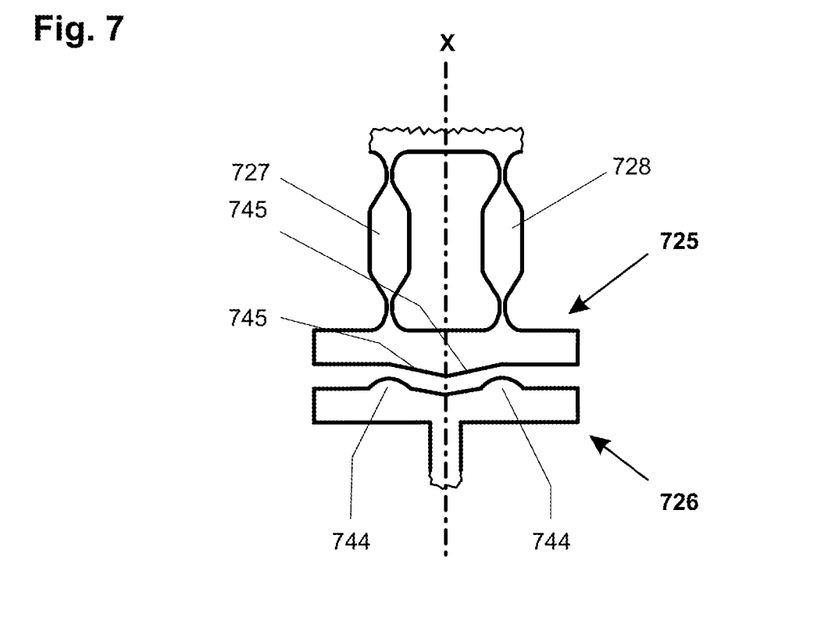
FIG. 7 illustrates an embodiment of a parallel-guided coupling means capable of transmitting only a compressive force.

FIG. 7 illustrates a possible design for a parallel-guided coupling means that is capable of transmitting a compressive force only. The parallel-guided coupling means comprises a fixed coupling part 726 and a parallel-guided coupling part 725, the latter having two parallel elements 727, 728 arranged parallel to each other. The parallel elements 727, 728 in this example are configured as guide members, each with two flexure pivots, but they could also be designed in any other form of parallel elements known to practitioners of this field. Their geometric arrangement enables them to absorb transverse forces that can occur when a force is transmitted through the parallel-guided coupling means.

Given that the forces transmitted in the calibration process are compressive forces and that the two parts 725, 726 of the coupling means can never be allowed to buckle under a load, the parallel-guided coupling part 725 needs to be inherently stable. The fixed coupling part 726 has a surface facing against the parallel-guided coupling part 725 with two projections representing first contact locations 744 which are arranged in mirror symmetry relative to the central longitudinal axis between the two parallel elements 727, 728. Further, the parallel-guided coupling part 725 has two second contact locations 745 which are facing towards the fixed coupling part 726 and against which the first contact locations 744 can seat themselves for force-transmitting contact. Accordingly, this design provides for contact locations 744, 745 which lie in a plane that is orthogonal to the central longitudinal axes X of the two parallel elements 727, 728 and which serve to center the two parts 725, 726 of the coupling means relative to each other when a calibration force is transmitted between them.

As illustrated in FIG. 7, this configuration allows the parallel-guided coupling part 725 and the fixed coupling part 726 to be aligned with each other in the calibration process. This allows displacements orthogonal to the central longitudinal axes X of the parallel elements 727, 728 to be prevented. To perform their alignment function, the two second contact locations 745 on the parallel-guided coupling part 725 are inclined at an obtuse angle relative to each other.

FIGS. 8 to 11 show additional embodiments of the parallel-guided coupling means for the transmission of tractive forces.

Figure 8:
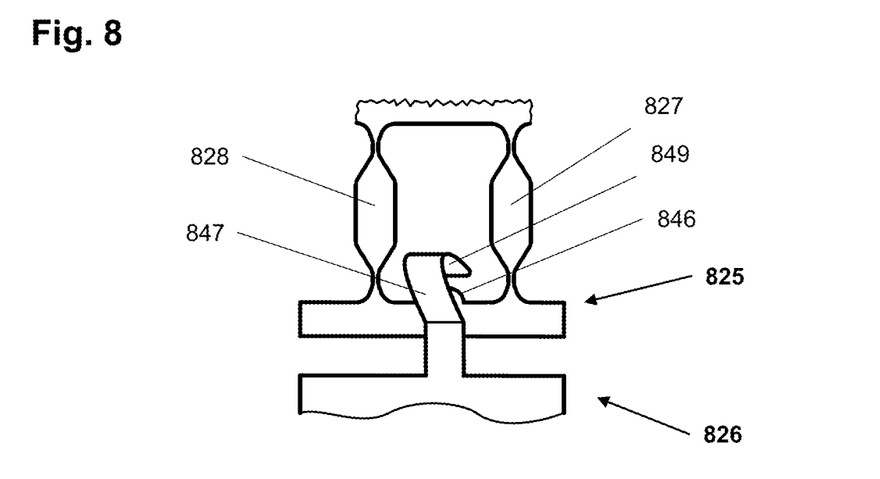
FIG. 8 illustrates an embodiment of a parallel-guided coupling means capable of transmitting only a tractive force.

FIG. 8 shows a parallel-guided coupling means with a fixed coupling part 826 and with a parallel-guided coupling part 825 whose two parallel elements 827, 828 have pivoting joints in the form of narrow, flexible material connections.

The two parallel elements 827, 828 are oriented parallel to each other. In addition a first traction element 846 is formed between the parallel elements 827, 828. The fixed coupling part 826 of the coupling means comprises a second traction element 847. When there is a force to be transmitted from the fixed coupling part 826 to the parallel-guided coupling part 827, the first traction element 846 and the second traction element 847, after a slight relative displacement, enter into engagement with each other. To provide an even more reliable transfer of tractive forces, the first traction element 846 can have a projection as shown here, and the second traction element 847 can have a receiving seat 849. As soon as the first traction element 846 and the second traction element 847 are in engagement with each other, the projection and the receiving seat 849, due to the way in which they are shaped, are in self-centering alignment with each other, and the projection is in force-transmitting contact with the receiving seat 849.

Figure 9:
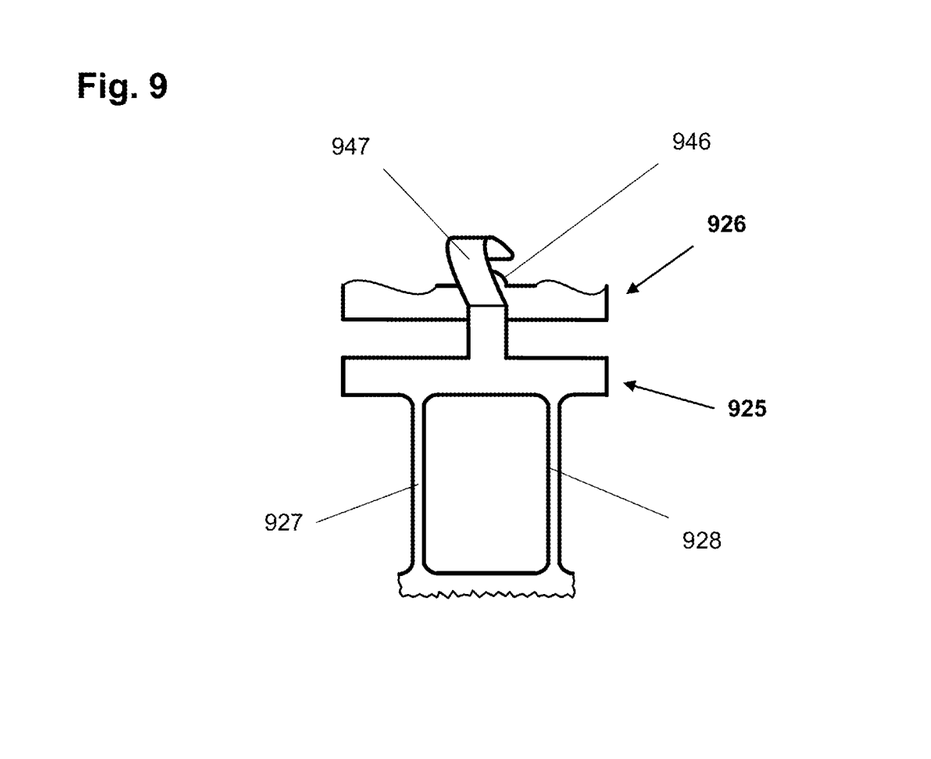
FIG. 9 illustrates a further embodiment of a parallel-guided coupling means capable of transmitting only a tractive force.

FIG. 9 illustrates a further embodiment of the parallel-guided coupling means of FIG. 8, wherein a parallel-guided coupling part 925 comprises a second traction element 947 with a receiving seat and a fixed coupling part 926 comprises a first traction element 946 with a projection, wherein the projection and the receiving seat can enter into engagement with each other in order to transmit a force, as described above in the context of FIG. 8. As a further design detail, the parallel-guided coupling part 925 in this example has two parallel elements 927, 928 configured as leaf springs.

Figure 10:
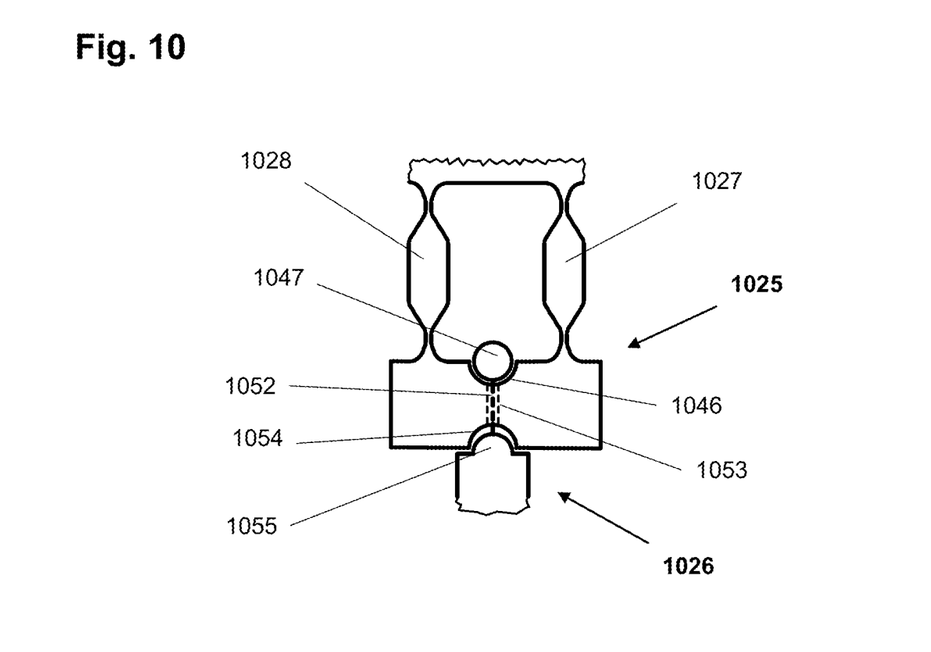
FIG. 10 illustrates a further embodiment of a parallel-guided coupling means capable of transmitting only a tractive force.

FIG. 10 shows a further parallel-guided coupling means with a parallel-guided coupling part 1025 and a fixed coupling part 1026. The parallel-guided coupling part 1025 comprises a second traction element 1046 in the form of an indentation which functions as a receiving seat and is located midway between the two parallel elements 1028, 1027 which have flexure pivots in the form of narrow material connections. The fixed coupling part 1026 of the coupling means comprises a first traction element 1046 which functions like a projection and is in this case configured as a sphere or a rod. The first traction element 1046 is connected to the fixed coupling part 1026 by way of a connector element 1052 which is arranged essentially in the interior of the parallel-guided coupling part 1025 of the coupling means with clearance to allow free movement. For the centered alignment of the two traction elements, the passage hole 1053 in the parallel-guided coupling part 1025, at the opening that faces away from the traction element 1046, can have a recess 1054 into which a projection 1055 can protrude which is formed on the fixed coupling part 1026.

Figure 11:
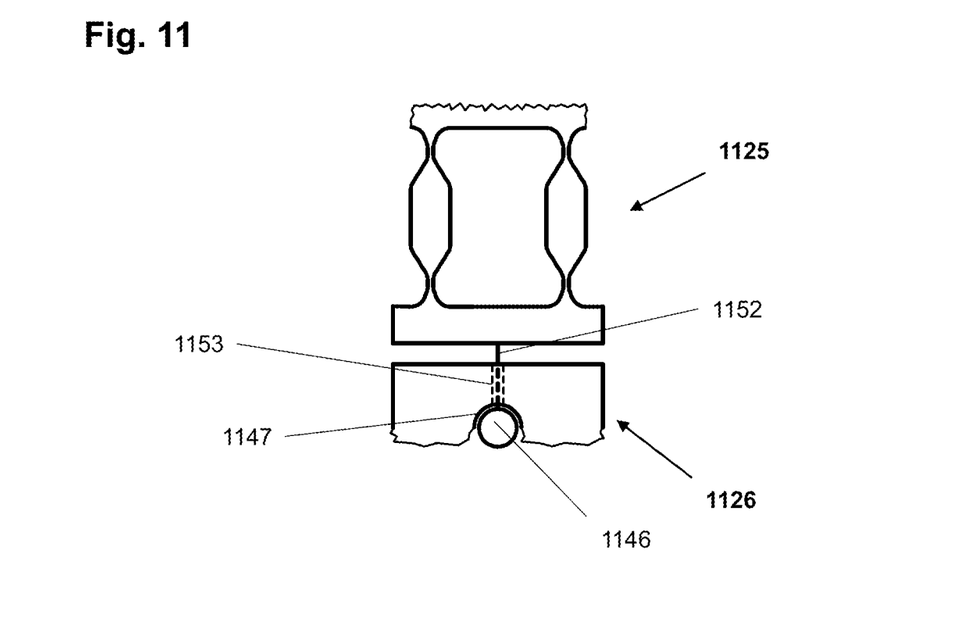
FIG. 11 illustrates a further embodiment of a parallel-guided coupling means capable of transmitting only a tractive force.

FIG. 11 illustrates a further parallel-guided coupling means with a fixed coupling part 1126 and parallel-guided coupling part 1125, wherein the latter comprises a first traction element 1146 in the form of a sphere or a rod that is connected to the parallel-guided coupling part 1125 by way of a connector means 1152. The fixed coupling part 1126 has a passage hole 1153 which surrounds the connector element 1152 over at least part of its length and whose opening at the end that faces away from the parallel-guided coupling part 1125 is configured as a receiving seat representing a second traction element 1147.

The second traction elements shown in FIGS. 8 and 9 could likewise be arranged so that they extend at least partially inside the part of the coupling means that contains the first traction element, analogous to the second traction elements shown in FIGS. 10 and 11.

Figure 12:
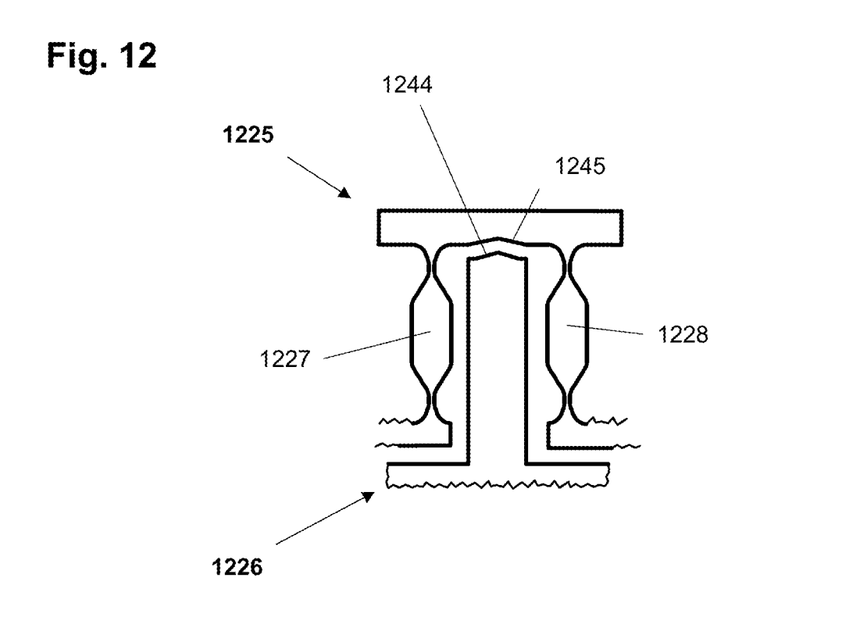
FIG. 12 illustrates a further embodiment of a parallel-guided coupling means capable of transmitting only a compressive force.

FIG. 12 illustrates a further parallel-guided coupling means that is capable of transmitting a compressive force. The parallel-guided coupling means comprises a fixed coupling part 1226 and a parallel-guided coupling part 1225. The fixed coupling part 1226 has a kind of upstanding post at whose free end a contact location 1244 is formed. The post is arranged between the two parallel elements 1227, 1228 of the parallel-guided coupling part 1225. The contact location 1244 can be brought into contact with contact location 1245 which is arranged on the parallel-guided coupling part 1225.

Although the invention has been described by presenting specific exemplary embodiments, it is considered obvious that numerous further variants could be created based on the teachings of the present invention, for example by combining the features of the individual examples of embodiments with each other and/or by interchanging individual functional units between the embodiments. Among many other possibilities, embodiments of the invention are conceivable which contain, for example, a plurality of calibration weights which can be coupled independently of each other to a lever arrangement by means of parallel-guided coupling means as proposed according to the invention. This would make it possible, for example, to realize almost any desired expansion of the weighing range of a balance. Of course, one could also use parallel-guided coupling means, calibration levers and calibration weights that are divided vertically into two or more segments and can be operated independently of each other. Embodiments are also possible in which the calibration lever and the calibration weight are monolithically combined.

Further advantages of the inventive arrangement stem from the fact that different load ranges can be covered by varying the length of the calibration lever arm, i.e. by mounting the calibration weight at different fulcrum distances along the calibration lever arm. With a suitable design, it would also be possible to arrange an adjustment screw between the calibration weight and the calibration lever for the purpose of adjusting the exact distance between the calibration weight and the fulcrum point of the calibration lever. This allows the calibration force to be set by a precise position adjustment of the weight, so that different production units of the calibration device will have the same calibration force regardless of discrepancies caused by manufacturing tolerances and inhomogeneous materials.

What is claimed is:

1. A force-transmitting mechanism of a gravimetric measuring instrument, the force-transmitting mechanism comprising:
    a stationary portion;
    a load-receiving portion;
    a measurement transducer, arranged on the stationary portion and joined to the load-receiving portion through a force-transmitting connection that acts either directly or by way of: at least one coupling element and at least one lever;
    a calibration lever, comprising a first and a second calibration lever arm, the respective calibration lever arms defined by a fulcrum that is mounted on the stationary portion;
    a calibration weight, rigidly connected to the first calibration lever arm; and
    arranged between the second calibration lever arm and either the at least one coupling element or one of the lever arms of the at least one lever or the load-receiving portion, a parallel-guided coupling means, divided into a fixed coupling part and a parallel-guided coupling part which comprises a first and a second parallel element that are arranged parallel to each other, with the fixed coupling part and parallel-guided coupling part arranged to transmit a tractive or a compressive force between the respective coupling parts; so that the first and second parallel elements, in order to absorb relative traverse displacements that occur in transmitting a force through the parallel-guided coupling means, tie the second calibration lever arm to at least one of: the load-receiving portion, the at least one coupling element, the at least one lever arm.

2. The force-transmitting mechanism of claim 1, wherein:
    the fixed coupling part and the parallel-guided coupling part comprise a pair of contact locations that are oriented in a facing relationship.

3. The force-transmitting mechanism of claim 1, wherein:
    one of the fixed coupling part and the parallel-guided coupling part comprises a first traction element with a projection; and
    the other of the fixed coupling part and the parallel-guided coupling part comprises a second traction element with a receiving seat,
    the respective traction elements reaching into each other with the projection aligned with the receiving seat so that the projection bears against the receiving seat when tractive forces are transmitted.

4. The force-transmitting mechanism of claim 3, wherein:
    the coupling part comprises the second traction element; and
    the first traction element is arranged at least partially inside the coupling part.

5. The force-transmitting mechanism of claim 4, wherein:
    at least one of the first and second parallel elements comprises at least one pivot formed by a narrow and flexible material connection.

6. The force-transmitting mechanism of claim 1, wherein:
    the parallel-guided coupling part is connected to the second calibration arm.

7. The force-transmitting mechanism of claim 1, further comprising:
    at least one upper parallel-guiding member; and
    at least one lower parallel-guiding member;
    each of the parallel-guiding members constraining the load-receiving portion for guided vertical movement in the operating position of the force-transmitting mechanism relative to the stationary portion.

8. The force-transmitting mechanism of claim 1, wherein:
    the load-receiving portion, the stationary portion, the calibration lever and the parallel-guided coupling means are formed as a monolithic unit.

9. The force-transmitting mechanism of claim 1, wherein:
    at least one of the first and second parallel elements comprises at least one pivot formed by a narrow and flexible material connection.

10. The force-transmitting mechanism of claim 1, further comprising:
    at least one upper parallel-guiding member; and
    at least one lower parallel-guiding member;
    each of the parallel-guiding members constraining the load-receiving portion for guided vertical movement in the operating position of the force-transmitting mechanism relative to the stationary portion.

11. The force-transmitting mechanism according of claim 1, wherein:
the load-receiving portion, the stationary portion, the calibration lever and the parallel-guided coupling means comprise a monolithic unit.

12. A gravimetric measuring instrument comprising:
a force-transmitting mechanism of claim 1, wherein the calibration weight is arranged to exert a weight force on the measurement transducer.

13. The gravimetric measuring instrument of claim 12, wherein:
the force exerted by the calibration weight acts on the measurement transducer in the same direction as a force applied to the load-receiving portion.

14. The gravimetric measuring instrument of claim 12, wherein:
the weight force exerted by the calibration weight acts on the measurement transducer in the opposite direction as a force applied to the load-receiving portion.

15. The gravimetric measuring instrument of claim 12, wherein:
the calibration weight is made of a corrosion-resistant material with a density of 8.0 kg/dm$^3$.

16. The gravimetric measuring instrument of claim 12, further comprising:
to compensate for the effect of density, at least one of: an auxiliary mass attached to the calibration weight, and a pressure sensor for measuring the ambient barometric pressure of the gravimetric measuring instrument;
wherein the calibration weight is made of the same material as the force-transmitting mechanism.

17. A force-transmitting mechanism of a gravimetric measuring instrument, the force-transmitting mechanism comprising:
a stationary portion;
a load-receiving portion;
a measurement transducer, arranged on the stationary portion and joined to the load-receiving portion through a force-transmitting connection;
a calibration lever, comprising a first and a second calibration lever arm, the respective calibration lever arms defined by a fulcrum that is mounted on the stationary portion;
a calibration weight, rigidly connected to the first calibration lever arm; and
a parallel-guided coupling means, divided into a fixed coupling part and a parallel-guided coupling part which comprises a first and a second parallel element that are arranged parallel to each other, with the fixed coupling part and parallel-guided coupling part arranged to transmit a tractive or a compressive force between the respective coupling parts; so that the first and second parallel elements, in order to absorb relative traverse displacements that occur in transmitting a force through the parallel-guided coupling means, tie the second calibration lever arm to either the force-transmitting connection or the load-receiving portion.

18. The force-transmitting mechanism of claim 17, wherein:
at least one coupling element ties the second calibration lever arm to the force-transmitting connection.

19. The force-transmitting mechanism of claim 17, wherein:
an arm of at least one lever ties the second calibration lever arm to the force-transmitting connection.

20. A force-transmitting mechanism of a gravimetric measuring instrument, the force-transmitting mechanism comprising:
a stationary portion;
a load-receiving portion;
a measurement transducer, arranged on the stationary portion and joined to the load-receiving portion through a force-transmitting connection;
a calibration lever, comprising a first and a second calibration lever arm, the respective calibration lever arms defined by a fulcrum that is mounted on the stationary portion;
a calibration weight, rigidly connected to the first calibration lever arm; and
a parallel-guided coupling means, arranged between the second calibration lever arm and the load-receiving portion, the parallel-guided coupling means being divided into a fixed coupling part and a parallel-guided coupling part which comprises a first and a second parallel element that are arranged parallel to each other, with the fixed coupling part and parallel-guided coupling part arranged to transmit a tractive or a compressive force between the respective coupling parts; so that the first and second parallel elements, in order to absorb relative traverse displacements that occur in transmitting a force through the parallel-guided coupling means, tie the second calibration lever arm directly to the load-receiving portion or indirectly through the force-transmitting connection.

* * * * *